J. U. Fiester.
Post Hole Shovel.
Nº 29,153.   Patented Jul. 17, 1860.
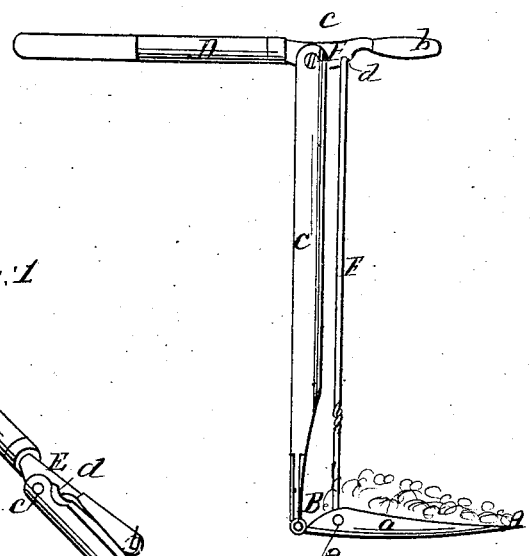
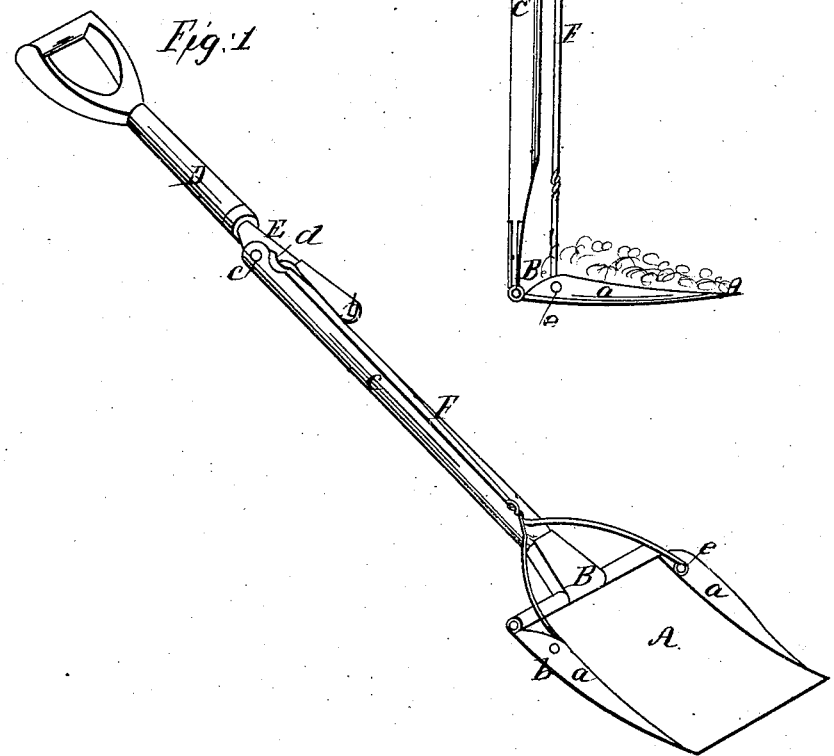
Witnesses;
Joseph Woodruff
Chas B. Burch.
Inventor;
John U. Fiester
per
J. G. Clayton

UNITED STATES PATENT OFFICE.

J. U. FIESTER, OF WINCHESTER, OHIO.

IMPROVEMENT IN SHOVELS.

Specification forming part of Letters Patent No. 29,153, dated July 17, 1860.

To all whom it may concern:

Be it known that I, JOHN U. FIESTER, of Winchester, in the county of Guernsey and State of Ohio, have invented a new and useful Post-Hole Shovel; and I do hereby declare that the following is a full and exact description thereof, reference being had to the accompanying drawings, and to the letters of reference marked thereon.

Figure 1 shows the shovel as it appears when about to be forced into the ground. Fig. 2 is the shovel when about to be removed with the dirt.

To enable others to make and use my invention, I will describe its construction and operation.

In both figures similar characters refer to like parts.

A is the scoop or shovel-bowl, which has edges or sides $a$; B, the hinges at the upper end of the scoop, and by which it is hinged to the lower handle, C; D, the upper handle, similar to the handles of other spades or shovels; E, a short metallic lever, extended into the handle D, and fastened therein by a ferrule. The center of this lever is pivoted at $c$ in the upper end of handle C. On the lower end of the lever E is a small handle, $b$; F, the connecting-rod, pivoted at $d$ to lever E at a point between $b$ and $c$. This rod F is forked at the lower end and attached at $e\ e$ to the sides $a\ a$ of the shovel A.

In operating my invention, which is to be known and used as "Fiester's Post-Hole Shovel," I take the shovel, as shown in Fig. 1, and put it down straight, and by the side of the post-hole of which the dirt is to be removed. I then press the handle D downward and backward until it (lever E) and handle $b$ each form a right angle with the main handle C. This action, by elevating the lower end of lever E, does at the same time by connecting-rod F elevate the lower end of the shovel, and, changing its position, makes it parallel to the surface and the handle D and $b$, and at right angles with main handle E. (See Fig. 2.) In this position the handles D and $b$ are taken hold of, and the dirt over the shovel is readily and speedily removed.

Having thus fully described the construction and operation of my lever hinged posthole shovel, what I claim as new, and desire to secure by Letters Patent, is—

The lever-hinged shovel, constructed and operating as described, and for the purposes set forth.

JOHN U. FIESTER.

Witnesses:
SIMEON BROWN,
H. S. HIXSON.